(12) United States Patent
Ohgoshi et al.

(10) Patent No.: US 6,537,154 B1
(45) Date of Patent: Mar. 25, 2003

(54) GAME CONTROLLER

(75) Inventors: Kenji Ohgoshi, Fukushima-ken (JP); Shuzo Ono, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 343 days.

(21) Appl. No.: 09/624,650

(22) Filed: Jul. 25, 2000

(30) Foreign Application Priority Data

Jul. 27, 1999 (JP) ............................... 11-211587

(51) Int. Cl.$^7$ ................................. A63F 13/02
(52) U.S. Cl. ...................... 463/37; 463/36; 273/148 B
(58) Field of Search ..................... 463/36, 37, 38, 463/39; 273/148 B

(56) References Cited

U.S. PATENT DOCUMENTS

| | | | | |
|---|---|---|---|---|
| 5,232,223 A | * | 8/1993 | Dornbusch | 273/148 B |
| 5,542,672 A | * | 8/1996 | Meredith | 463/37 |
| 5,730,655 A | * | 3/1998 | Meredith | 463/37 |
| 6,001,014 A | * | 12/1999 | Ogata et al. | 463/37 |
| 6,049,194 A | * | 4/2000 | Nakagawa et al. | 322/20 |
| 6,283,859 B1 | * | 9/2001 | Carlson et al. | 463/36 |
| 6,312,335 B1 | * | 11/2001 | Tosaki et al. | 463/37 |

FOREIGN PATENT DOCUMENTS

JP           7-32819         4/1995

* cited by examiner

Primary Examiner—Michael O'Neill
Assistant Examiner—Julie Brocketti
(74) Attorney, Agent, or Firm—Brinks Hofer Gilson & Lione

(57) ABSTRACT

A controller for a fishing game, in which, when a handle of the controller is rotated, a counter electromotive force is produced between both ends of a generator in the controller. When a short circuit occurs between both terminals, an electrical current which produces a force (that is, a load torque) acting in a direction which prevents rotation of the generator flows between both of the terminals. Therefore, a load torque can be applied to at least the handle without using a driving electrical power supply. When the electrical current flowing between both terminals is controlled through a load-generating device from the side of the body of a game device, a load torque which matches the content of the game being played can be applied to the handle.

4 Claims, 3 Drawing Sheets

GAME CONTROLLER

BACKGROUND OF THE INVENTION

1. Field of the Invention

The present invention relates to a controller of, for example, a television game device, and, more particularly, to a game controller which allows a player to enjoy, for example, virtually fishing in a game while making the player feel that fishing in the game more closely resembles the act of actually catching a fish as a result of adjusting the load exerted on the controller.

2. Description of the Related Art

Various kinds of software have been designed for recent TV games. For example, software which allows a person to, for example, virtually catch a fish in TV games is being sold.

In TV games, a controller incorporates various functions to allow a player playing a game to virtually carry out something in accordance with the content of the software while making the player feel that, for example, catching a fish in the game more closely resembles the act of actually catching a fish.

FIG. 4 schematically illustrates the structure of a conventional controller. A controller 1 is a special-purpose device used in a crane game, particularly, a fishing game. The controller 1 includes a grip (not shown) corresponding to the base end of a fishing rod, and a winding section 2 formed in imitation of a reel which winds up a fishing line.

A handle 3 is rotatably supported by the winding section 2 of the controller 1. The handle 3 corresponds to an operating handle for turning the reel on the fishing rod. When the player catches a fish in the game, the fishing line can be wound up by rotating the handle 3 in the direction of arrow $\alpha 1$, making it possible for the player to enjoy virtually catching a fish in the game.

A gear 3b which rotates integrally with the handle 3 is provided on a rotary shaft 3a of the handle 3, and engages a connecting gear 4 provided adjacent to the gear 3b. The controller 1 includes a motor 5 for generating a load torque acting in a direction opposite to the direction in which the handle 3 is wound up. A gear 5a provided on a rotary shaft of the motor 5 and the connecting gear 4 engage each other. A motor controlling circuit 6 is provided at the motor 5 in order to control the rotation of the motor 5 by a command from the body of a game device (not shown).

When a fish is caught during the game, a control signal S is emitted from the body of the game device to the motor controlling circuit 6 of the controller 1. Driving electrical power required to rotate the motor 5 is supplied from a driving electrical power supply $E_{cc}$ through the motor controlling circuit 6. This causes the motor 5 to be rotationally driven in the direction of arrow $\beta 1$ shown in FIG. 4. When the motor 5 is rotated in the direction of arrow $\beta 1$, a speed-decreasing gear 3b of the handle 3 is rotated in the direction of $\alpha 2$ shown in FIG. 4 through the connecting gear 4. This causes the handle 3 to rotate in a direction opposite to the winding direction (that is, the direction of arrow $\alpha 1$), so that a load torque is produced on the handle 3. The controller 1 causes the player to feel this load torque, indicating to the player that a fish has been caught.

For example, when the motor 5 is not rotated in the opposite direction (that is, when no load is exerted on the motor 5), it becomes easier to wind the handle 3, thereby indicating to the player that a fish has not been caught. On the other hand, when the motor 5 is rotated in the opposite direction (so that the handle 3 rotates in the direction of arrow $\alpha 2$), it becomes difficult to rotate the handle 3 in the winding direction (that is, in the direction of arrow $\alpha 1$). Accordingly, when the player finds it difficult to wind the handle 3 when operating it, the player feels as if he or she has caught a fish. Therefore, the player feels that catching a fish in the game more closely resembles the act of actually catching a fish.

However, in the conventional controller 1, a load torque is exerted on the handle 3 by rotating the motor 5 in the direction opposite to the direction in which the handle 3 is wound, so that the driving electrical power supply $E_{cc}$ for rotationally driving the motor 5 is required. Thus, a cable for supplying electrical power is required, making it difficult to make the controller 1 cordless. The controller 1 may be made cordless by incorporating a battery used for driving the motor 5 in the controller 1. However, when the motor 5 is driven by a battery, the battery consumption time is shortened. Therefore, a large battery with a large capacity is required, or a plurality of batteries must be connected in a parallel arrangement, so that the controller 1 becomes heavy.

In addition, in the case where a load torque is produced, that is, when a fish is caught, when the player lets go of the handle 3 (called a handle free state), the handle 3 is rotated in the opposite direction. Therefore, conventionally, it has been necessary to provide a clutch mechanism or the like to prevent the handle 3 from rotating in the opposite direction. When a clutch pad in the clutch mechanism wears, it becomes impossible to prevent the handle 3 from rotating in the reverse direction.

A predetermined load torque is produced by applying a certain previously set voltage to the motor 5. Therefore, it is difficult to make the player feel the load in accordance with how much the handle 3 is wound up between the time immediately after the fish is caught and the time the fish is pulled up.

SUMMARY OF THE INVENTION

To overcome the above-described conventional problems, it is an object of the present invention to provide a game controller which can produce a load torque on a handle without applying electrical power.

It is another object of the present invention to provide a game controller which allows a player to, for example, virtually catch a fish in a game while feeling that fishing in the game more closely resembles the act of actually catching a fish as a result of applying a load torque onto the handle in accordance with the size of an input rotational force applied to the handle by the player.

To this end, according to the present invention, there is provided a game controller comprising:

rotational operating means;

rotation-detecting means for obtaining a detection output in accordance with a rotation of the rotational operating means; and load-generating means for exerting a load on the rotational operating means;

wherein the load-generating means comprises a rotor rotated by the rotational operating means, a stator opposing the rotor, a magnet provided in either one of the rotor and the stator, a coil provided in either of the other of the rotor and the stator, and switching means for switching between an insulated state and a short-circuited state at both ends of the coil.

Although not exclusive, the game controller may be such that a closed circuit is formed by both ends of the coil, and the switching means for switching between an insulated state and a short-circuited state at both ends of the coil, wherein the switching means provided in the closed circuit is controllable from outside the closed circuit.

In the present invention, when the rotor side is rotated while both ends of the coil are short-circuited, a counter electromotive force can be produced between both ends of the coil, making it possible to produce a load torque which acts in a direction opposite to the direction of rotation of the rotor. Therefore, it becomes unnecessary to supply electrical power required to generate a load torque from outside the controller. In other words, a load torque can be produced without a driving electrical power supply.

When the switching means which causes both ends of the coil to be short-circuited is operated from outside the controller, it can be controlled so as to produce or not produce a load torque. When the handle (that is, the rotational operating means) of the controller is rotated quickly, a large load torque is produced, whereas, when the handle is rotated slowly, a small load torque is produced. In other words, a load torque proportional to the rotational speed of the handle (that is, the size of the rotational force input to the handle) can be produced, so that a player operating the controller can, for example, virtually fish in a game while feeling that fishing in the game more closely resembles the act of actually catching a fish.

When a closed circuit is formed by both ends of the coil and the switching means for switching between an insulated state and a short-circuited state at both ends of the coil, and when the switching means provided in the closed circuit is controllable from outside the closed circuit, the switching means provided in the closed circuit may comprise a switching element for switching between the insulated state and the short-circuited state at both ends of the coil, and signal-transmitting means for controlling the switching element, and the switching element may be operated by applying a control signal to the signal-transmitting means from outside the signal-transmitting means.

In the above-described structure, it is possible to achieve electrical insulation between the input side (that is, the primary side) of the switching element to which a control signal is applied and the secondary side where switching between an electrically insulated state and a short-circuited state between both ends of the coil is performed. Therefore, it is possible to prevent electrical current at the secondary side from flowing around the primary side. Consequently, neither excessive electrical current nor excessive electrical voltage flows to or is applied to the primary side, so that it is possible to prevent failures from occurring at the controlling section (that is the game device body) side.

When the switching means provided in the closed circuit comprises a switching element for switching between the insulated state and the short-circuited state at both ends of the coil, and signal-transmitting means for controlling the switching element, and when the switching element is operated by applying a control signal to the signal-transmitting means from outside the signal-transmitting means, the game controller may further comprise means for controlling a duty ratio of the control signal applied to the signal-transmitting means, wherein the size of a rotational load of the rotational operating means is controllable by varying the duty ratio.

When the switching means provided in the closed circuit comprises a switching element for switching between the insulated state and the short-circuited state at both ends of the coil, and signal-transmitting means for controlling the switching element, and when the switching element is operated by applying a control signal to the signal-transmitting means from outside the signal-transmitting means, the signal-transmitting means may be either an optically coupled element or a magnetically coupled element.

In the above-described structure, by controlling the switching element by the controlling section, the size of the electrical current produced by the counter electromotive force generated in the coil can be adjusted, so that the size of the load torque which acts in a direction preventing rotation of the rotor can be varied. Therefore, a player can enjoy virtually fishing in a game while feeling that fishing in the game more closely resembles the act of actually catching a fish.

The optically coupled element is, for example, a photocoupler, and the magnetically coupled element is, for example, a pulse transistor. Other isolation amplifiers may also be used.

DESCRIPTION OF THE PREFERRED EMBODIMENT

Hereunder, a description of the present invention will be given with reference to the drawings.

Figure 1:
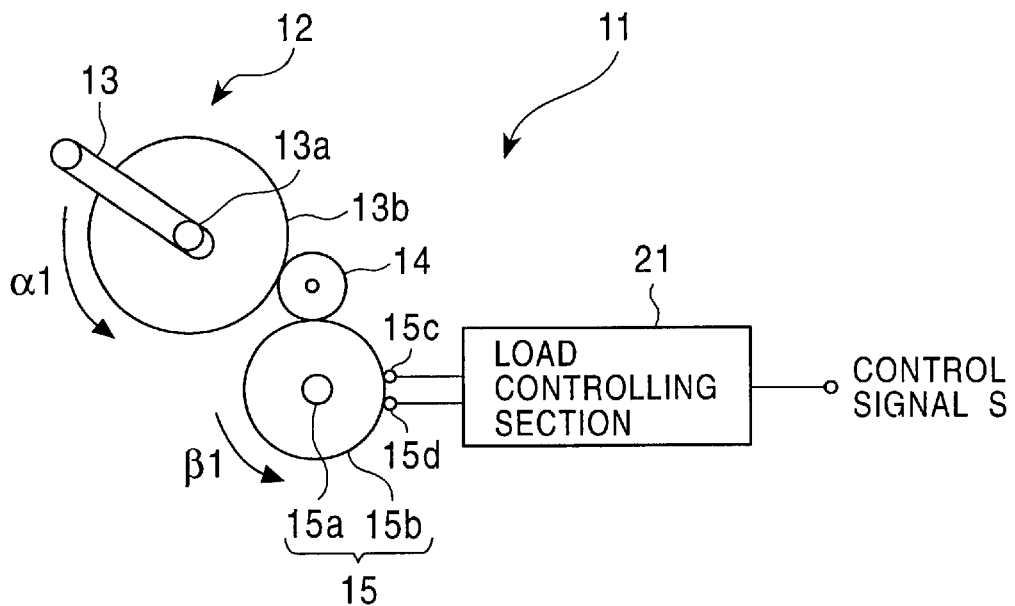
FIG. 1 illustrates the structure of a game controller in accordance with the present invention.
Figure 2:
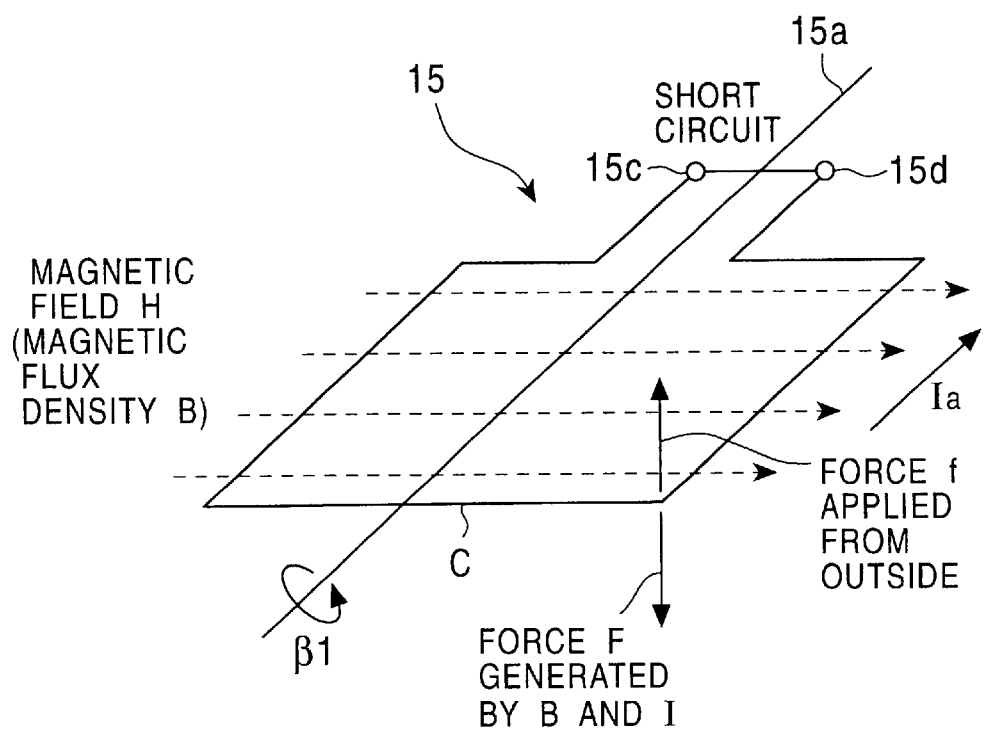
FIG. 2 illustrates the principles of the production of a load.
Figure 3:
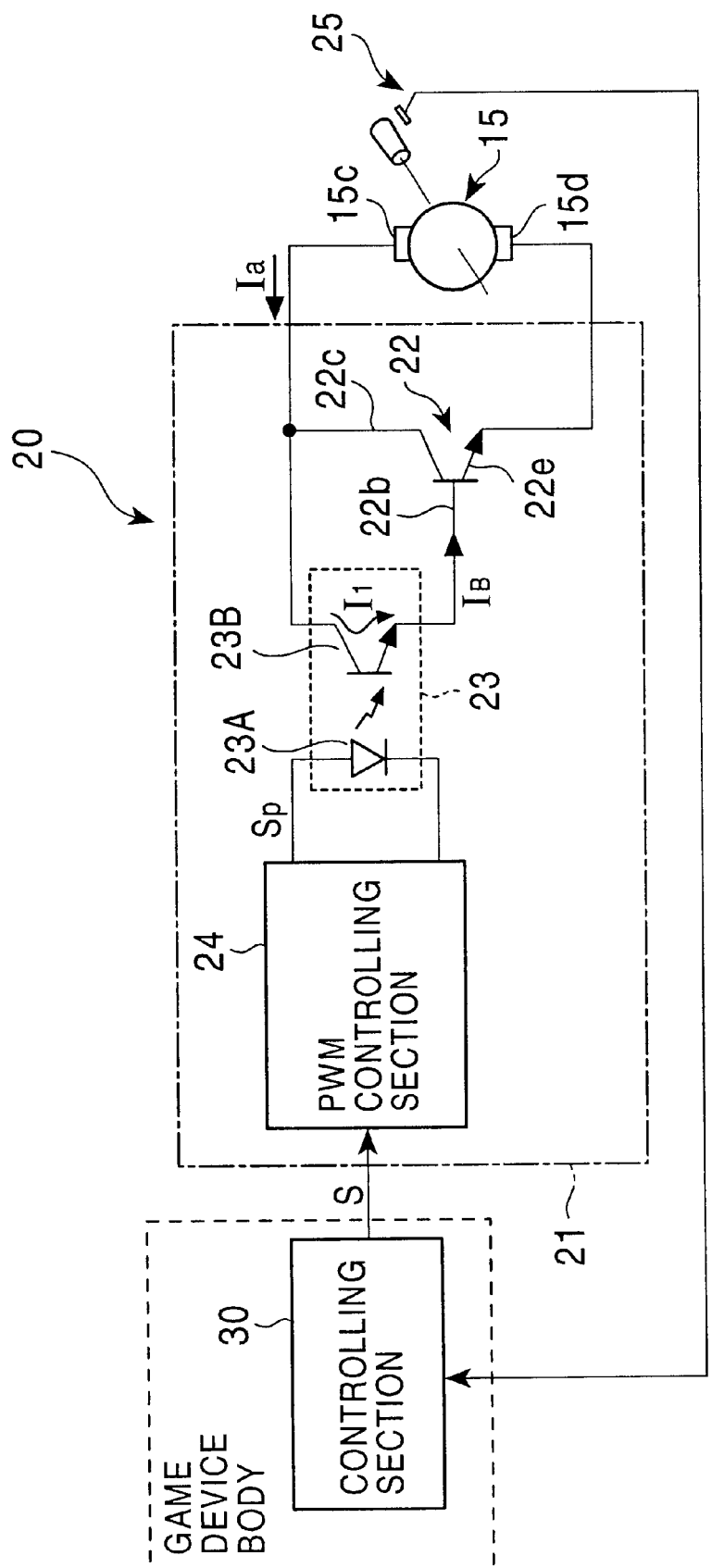
FIG. 3 illustrates the structure of a circuit in the controller, in which a load-generating means is shown.
Figure 4:
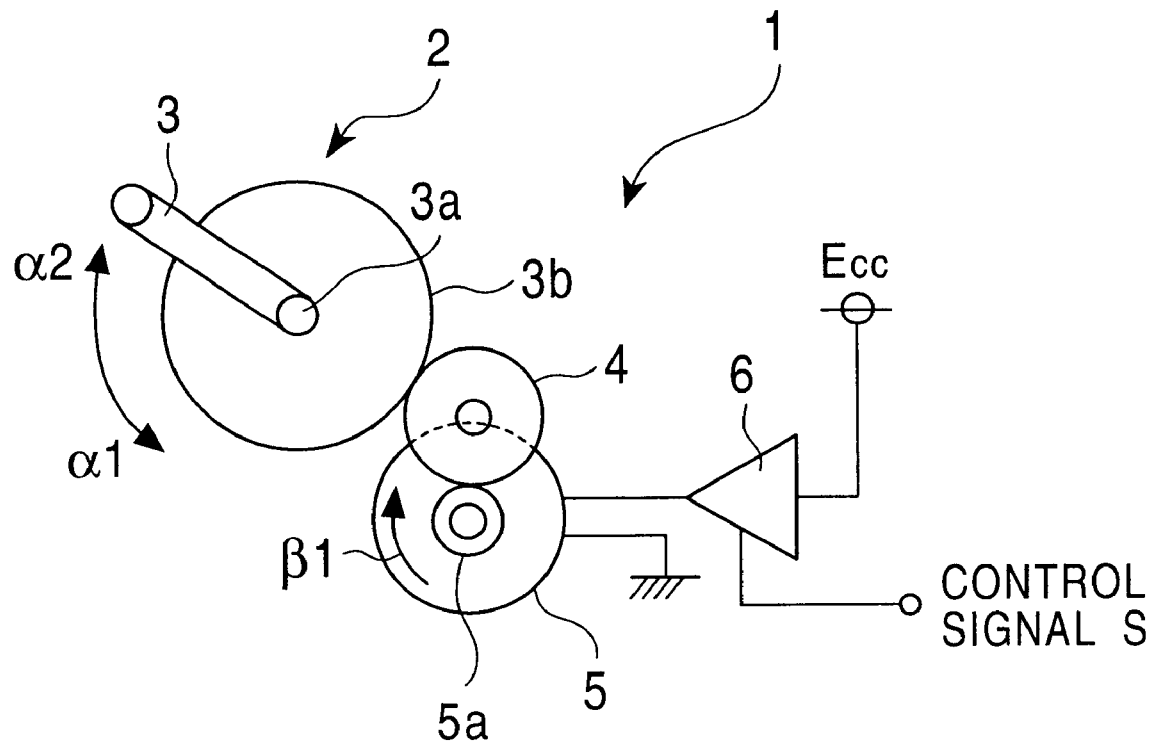
FIG. 4 is a schematic view illustrating the structure of a conventional controller.

FIG. 1 illustrates the structure of a game controller in accordance with the present invention. FIG. 2 illustrates the principles of the production of a load. FIG. 3 illustrates the structure of a circuit in the controller, in which a load-generating means used in the embodiment is shown.

FIG. 1 illustrates a controller 11 used in a crane game, such as a fishing game. It primarily illustrates the structure of a winding section 12 (of the controller 11) which corresponds to a reel provided near a grip (not shown) of a fishing rod. The game controller 11 can control the load on the winding section 12. Therefore, the controller 11 can be widely used in various other games in order to, example, control the load on a pedal in a vehicle game or control the load on an oar in a boat game.

A handle (that is, a rotational operating means) 13 for simulating the winding up of a fishing line is provided on the winding section 12. It is rotatably supported by the winding section 12. An encoder (that is, a rotation detecting means) 25 (see FIG. 3) disposed in the inside of the handle 13 is capable of detecting the number of rotations of the handle 13. The number of rotations is used for computation at a controlling section 30 disposed in the body of a game device in order to allow detection of, for example, the number of rotations per unit time (see FIG. 3).

A gear 13b is provided on a rotary shaft 13a of the handle 13, and engages a connecting gear 14 provided adjacent to the gear 13b. A generator 15 (such as a direct-current (DC) motor) is provided in the controller 11. In the generator 15, a rotor 15a is rotatably supported by a stator which is a stationary section. In the generator 15, a magnet may be provided at a stator side and a coil may be provided at a rotor side, or a magnet may be provided at the rotor side and a coil may be provided at the stator side. A gear 15b is provided on the rotor 15a, and engages the connecting gear 14.

More specifically, the rotary shaft 13a of the handle 13 and the rotor 15a of the generator 15 are driven through the gear 13b and the connecting gear 14, respectively. Here, the rotation of the rotary shaft 13a may be transmitted to the rotor 15a after increasing or decreasing the rotational speed of the rotary shaft 13a. However, when a large load is exerted on the handle 13 from the generator 15, it is preferable that the rotational force of the handle 13 be transmitted to the rotor 15a of the generator 15 after increasing the rotational speed.

When the handle 13 of the controller 11 is rotated in the direction of arrow α1, this rotation is transmitted to the generator 15 through the connecting gear 14, causing the rotor 15a of the generator 15 to rotate in the direction of arrow β1. The rotation of the rotor 15a rotates a coil provided in the generator 15, thereby starting generation of electrical power. The generated electrical power is output from output terminals 15c and 15d on two ends of the generator 15 (see FIG. 3).

As shown in, for example, FIG. 2, in the generator 15 (which is, for example, a DC motor), a plane of a coil C provided on the rotor 15a can vertically cross a magnetic field H produced by a magnet (not shown) provided at the stator side of the generator 15. Since the magnetic flux linkage in the coil C provided on the rotor 15a changes when a rotational force (input force f) acting in the direction of arrow β1 is applied to the rotor 15a by applying an external force, an induced electromotive force (that is, a counter electromotive force) is generated between both ends of the coil C (that is, between the output terminals 15c and 15d of the generator 15).

When the handle 13 is rotated while both ends of the coil C are directly connected together in a short-circuited state, the counter electromotive force that has been generated causes an electrical current (that is, a feedback current $I_a$) to flow. A force F is produced in a direction determined by Fleming's left-hand rule due to the relationship between the feedback current $I_a$ and the magnetic field H (that is, the magnetic flux density B) in the generator 15. Since the force F acts in a direction opposite to the direction of the input force f that rotates the handle 13, a load torque which prevents rotation of the handle 13 is produced.

The feedback current $I_a$ is proportional to the input force f applied to the handle 13. Therefore, when a large force is exerted on the handle 13 (that is, when the handle 13 is rotated at a high speed), a large feedback current $I_a$ can be produced. In contrast to this, when a small force is exerted on the handle 13 (that is, when the handle 13 is rotated at a low speed), a small feed back current $I_a$ can be produced. Consequently, when the handle 13 is rotated quickly, a large load torque is produced, whereas when the handle 13 is rotated slowly, a small load torque is produced, thereby making it possible to exert a load on the player operating the controller 11 in accordance with the rotational speed of the handle 13.

Unlike in conventional controllers, a load torque can be exerted on the handle 13 without using a driving electrical power supply used for rotating motors (that is, generators) in an opposite direction. Since a load torque corresponding to the size of the input force (that is, the rotational speed) when the player turns the handle 13 can be generated, the player can virtually catch a fish in the game while feeling that fishing in the game more closely resembles the act of actually catching a fish.

It is not necessary to use a driving power supply for rotating the generator, so that only a small battery with a small capacity for processing inside signals needs to be incorporated in the controller 11. Accordingly, since a large amount of electrical power does not need to be supplied from outside the controller 11, the controller 11 can be made cordless.

FIG. 3 illustrates the structure of a circuit inside the controller, in which a load-generating means used in the embodiment is shown.

A load-generating means 20 shown in FIG. 3 comprises the generator 15 and a load-controlling means 21. The load-controlling means 21 comprises a power transistor (that is, a switching element) 22 which functions as a switching means and an electrical current controlling means, a photocoupler (that is, a signal-transmitting means) 23, and a PWM controlling section (that is, a pulse-width controlling means) 24. The switching element 22 may also be, for example, a power FET.

The terminal 15c of the coil C in the generator 15 is connected to a collector 22c of the power transistor 22, while the terminal 15d of the coil C in the generator 15 is connected to an emitter 22e of the power transistor 22. In other words, the power transistor (that is, the switching element) 22 is connected between both terminals 15c and 15d of the coil C in a parallel arrangement, whereby one closed circuit is formed.

The photocoupler 23 includes a light-emitting element (that is, a light-emitting diode) 23A at a primary side, and a light-receiving element (that is, a phototransistor) 23B at a secondary side. The primary-side light-emitting element 23A is connected to the PWM controlling section 24. The secondary-side light-receiving element 23B is connected to the power transistor 22 in the Darlington manner.

The PWM controlling section 24 is connected to the controlling section 30 provided at the body side of the game device. It generates a pulse signal $S_p$ with a duty ratio based on a control signal S from the controlling section 30 in order to turn the light-emitting element 23A on or off.

The PWM controlling section 24 and the controlling section 30 may be connected with a cable or a cordless transmitting means which use, for example, infrared rays.

When the pulse signal $S_p$ output from the PWM controlling section 24 is an ON signal, a predetermined ON current flows to the primary-side light-emitting element 23A during the period in which the ON signal is output, so that the light-emitting element 23A emits light (that is, it is turned on). When the light-emitting element 23A emits light, a current $I_1$ flows from the collector of the secondary-side light-receiving element 23B to the emitter, so that the current $I_1$ turns into a base current $I_B$ of the power transistor 22. This causes the power transistor 22 to be in an ON state (that is, a closed state), so that a short-circuited state (that is, a closed state) occurs between the output terminals 15c and 15d of the generator 15. Thus, it is possible to make the feedback current $I_a$ flow towards the emitter 22e from the collector 22c of the power transistor 22, that is, between the output terminals 15c and 15d of the generator 15.

On the other hand, when the pulse signal $S_p$ output from the PWM controlling section 24 is an OFF signal, the light-emitting element 23A does not emit light during the period in which the OFF signal is generated (that is, when the light-emitting element 23A is an on OFF state), so that an open state occurs between the emitter and the collector of the secondary-side light-receiving element 23B. This causes the power transistor 22 to be in an OFF state, so that an insulated state occurs between the output terminals 15c and 15d of the generator 15.

In this way, the pulse signal $S_p$ output from the PWM controlling section 24 causes the power transistor 22 at the secondary side to perform a switching operation. Here, by changing a ratio between the pulse widths (that is, a duty ratio) of the pulse signal $S_p$ during the ON time and the OFF time, the size of the feedback current $I_a$ flowing between the output terminals 15c and 15d of the generator 15 can be adjusted. The switching operation of the power transistor 22 allows adjustment of the size of the load torque produced by the generator 15.

Hereunder, a description of the operation of the above-described game controller will be given.

When the handle 13 of the controller 11 is rotated during the game, the number of rotations thereof is counted by the encoder 25 in the generator 15, and data obtained by counting the number of rotates is transmitted to the controlling section 30 disposed at the body side of the game device. In the body of the game device, the data regarding the number of rotations is incorporated, and the control signal S which matches the content of the game being played is sent to the PWM controlling section 24 disposed adjacent the controller 11.

For example, when a person actually catches a fish, the pull on the fishing rod becomes stronger because the caught fish swims around and tries to escape. Thus, it is necessary for the player playing the fishing game to turn the handle, serving as a reel, with a strong force in order to bring the fish towards himself or herself using his or her hands. This situation is similar to the situation occurring when a large load torque is produced in the handle 13. Therefore, when the player catches a fish in the game, the controlling section 30 transmits the control signal S to make the PWM controlling section 24 output a pulse signal $S_p$ with a long ON time. This increases the ON time of the transistor 22 (that is, the ON time between the collector and the emitter), making it possible to make a large feedback current $I_a$ flow. Thus, it is possible to generate a large load torque at the generator 15. Here, the player can feel a large load by turning the handle 13 quickly. The large load felt by the player is very close to the load felt when a person actually catches a fish.

Fishes of different sizes can be caught. When a large fish is caught, a large load torque can be set by setting the ON time of the pulse signal $S_p$ long, whereas, when a small fish is caught, a small load torque can be set by setting the ON time of the pulse signal $S_p$ short.

In general, at the time a fish is caught, the fish pulls on the fishing rod strongly. As the person fishing brings the fish towards himself or herself by pulling on the fishing line with his or her hands, or as time passes, the pulling force of the fish on the fishing line gradually decreases. For a fishing game software, a program which allows a player to be in various situations is previously set. Therefore, in the situation where the pulling force of the fish on the fishing line gradually decreases, the controlling section 30 transmits to the PWM controlling section 24 a control signal S which matches this situation, that is, a control signal S which causes the ON time of the pulse signal $S_p$ to gradually decrease, causing the electrical current $I_a$ flowing in the closed circuit which contains the generator 15 and the power transistor 22 to decrease gradually. This allows the load torque produced on the handle 13 to decrease continuously, so that the situation where the pulling force of the fish on the fishing line gradually decreases can be reproduced by the controller 11 as if it were real.

Accordingly, when the controlling section 30 sends a control signal S which matches the content of a game being played to the PWM controlling section 24, the player can, for example, virtually catch a fish in the game while feeling that fishing in the game more closely resembles the act of actually catching a fish.

When the handle 13 of the controller 11 is not rotated, that is, when the player lets go of the handle 13, the generator 15 does not generate electrical power. Since the electrical current $I_a$ flowing in the closed circuit (that is, a parallel circuit) containing the generator 15 and the power transistor 22 is 0, a load torque in the opposite direction is not produced. Therefore, it is possible to prevent the conventional problem of the handle 13 rotating freely.

In the above-described structure, the photocoupler (that is, the signal-transmitting means) 23 can be used to electrically insulate the controller 11 and the controlling section 30 of the game device from each other. Therefore, it is possible to, for example, prevent excess electrical current or voltage generated in the generator 15 from flowing into or being applied to the body of the game device. Consequently, even if a failure occurs in the controller 11, it is possible to prevent the failure from adversely affecting the body of the game device.

Although, in the above-described embodiment, the controller is used for a fishing game, it may also be used for other crane games.

According to the invention described above in detail, a load is exerted on the handle of the controller, so that a driving electrical power supply is not needed.

In addition, a load torque is exerted on the handle in accordance with the size of the rotational force (that is, the input force) exerted on the handle by the player. Thus, a player can virtually catch a fish in a game while feeling that fishing in the game more closely resembles the act of actually catching a fish.

Further, when the handle is not rotated, it is not rotated in the opposite direction, so that, for example, a clutch mechanism for preventing rotation in the opposite direction is not needed.

What is claimed is:

1. A game controller comprising:

winding section;

rotation-detecting means for obtaining a detection output in accordance with a rotation of the winding section; and load-generating means for exerting a load on the winding section;

wherein the load-generating means comprises a rotor rotated by the winding section, a stator opposing the rotor, a magnet provided in either one of the rotor and the stator, a coil provided in either of the other of the rotor and the stator, and switching means for switching between an insulated state and a short-circuited state at both ends of the coil.

2. A game controller according to claim 1, wherein the switching means comprises a switching element for switching between the insulated state and the short-circuited state at both ends of the coil, and signal-transmitting means for controlling the switching element, wherein the switching element is operated by applying a control signal to the signal-transmitting means from outside the signal-transmitting means.

3. A game controller according to claim 2, further comprising means for controlling a duty ratio of the control signal applied to the signal-transmitting means, wherein the size of a rotational load of the winding section is controllable by varying the duty ratio.

4. A game controller according to claim 2, wherein the signal-transmitting means is either an optically coupled element or a magnetically coupled element.

* * * * *